US010687468B1

(12) United States Patent
    Wood

(10) Patent No.: US 10,687,468 B1
(45) Date of Patent: Jun. 23, 2020

(54) FLEXIBLE SYNCHRONOUS TOOTHED BELT WITH NARROW SPLICE

(71) Applicant: ContiTech Antriebssysteme GmbH, Hannover (DE)

(72) Inventor: Douglas Bruce Wood, Lincoln, NE (US)

(73) Assignee: ContiTech Antriebssysteme Gmbh, Hannover (DE)

( * ) Notice: Subject to any disclaimer, the term of this patent is extended or adjusted under 35 U.S.C. 154(b) by 51 days.

(21) Appl. No.: 16/223,142

(22) Filed: Dec. 18, 2018

(51) Int. Cl.
| | |
|---|---|
| A01D 61/00 | (2006.01) |
| A01D 57/20 | (2006.01) |
| B65G 15/36 | (2006.01) |
| B65G 23/06 | (2006.01) |

(52) U.S. Cl.
CPC ........... *A01D 61/002* (2013.01); *A01D 57/20* (2013.01); *B65G 15/36* (2013.01); *B65G 23/06* (2013.01); *B65G 2201/0202* (2013.01); *B65G 2812/02217* (2013.01)

(58) Field of Classification Search
CPC ... F16G 7/00; F16G 3/00; B29C 66/71; Y10T 24/166; Y10T 24/1676
USPC .................................................. 474/205, 257
See application file for complete search history.

(56) References Cited

U.S. PATENT DOCUMENTS

| | | | | | |
|---|---|---|---|---|---|
| 383,208 | A | * | 5/1888 | Binns ...................... | F16G 3/00 474/255 |
| 608,886 | A | * | 8/1898 | Marvel ..................... | F16G 3/00 474/255 |
| 1,414,278 | A | * | 4/1922 | Hennigan ................. | F16G 7/00 24/310 |
| 1,505,553 | A | * | 8/1924 | Gilmore ................... | F16G 11/02 403/209 |
| 1,570,801 | A | * | 1/1926 | Vollrath .................... | F16G 3/06 24/37 |
| 1,897,221 | A | * | 2/1933 | Warner .................... | F16G 11/046 403/209 |
| 2,069,385 | A | * | 2/1937 | Olsen ....................... | F16G 7/00 24/33 M |
| 2,113,855 | A | * | 4/1938 | Olsen ....................... | F16G 7/00 24/33 M |
| 2,295,029 | A | * | 9/1942 | Cooney .................... | F16G 7/00 474/257 |
| 2,322,967 | A | * | 6/1943 | Perry ....................... | F16G 7/00 24/310 |

(Continued)

FOREIGN PATENT DOCUMENTS

| | | |
|---|---|---|
| DE | 2356072 A1 | 5/1975 |
| DE | 202005020662 U1 | 5/2006 |

*Primary Examiner* — Henry Y Liu
(74) *Attorney, Agent, or Firm* — David L. Cate; Gregory J. Adams

(57) ABSTRACT

Belts having a cover layer and opposing continuous tooth section defining an outer surface, a cross-linked elastomeric body, and a tensile reinforcement section disposed between the cover layer and the cross-linked elastomeric body. The continuous tooth section includes a plurality of tooth structures, each having tooth flank, a land, and an easement area between the tooth flank and the land, and the easement area has a progressively decreasing radial thickness from the tooth flank to the land. In some aspects, the easement area has a low pressure-angle of contact with a sprocket, when engaging a sprocket. In some aspects, the belt is an endless belt, while in some other aspects, the belt is a spliced belt having a splice.

14 Claims, 13 Drawing Sheets

(56) References Cited

U.S. PATENT DOCUMENTS

| | | | | |
|---|---|---|---|---|
| 2,446,311 A | * | 8/1948 | Traxler | F16G 7/00 474/257 |
| 2,449,950 A | * | 9/1948 | Nassimbene | F16G 7/00 24/31 W |
| 2,814,845 A | * | 12/1957 | Hjort | F16G 3/00 24/33 K |
| 2,883,871 A | * | 4/1959 | Poeschl | F16G 3/08 474/257 |
| 3,084,408 A | * | 4/1963 | Ireland | F16G 7/00 24/33 M |
| 3,105,390 A | * | 10/1963 | Hans-Holger | B65G 15/42 474/205 |
| 3,618,384 A | * | 11/1971 | Bierlein | F16G 7/00 474/257 |
| 3,664,101 A | * | 5/1972 | Hurlburt | A01D 57/03 56/220 |
| 3,810,278 A | * | 5/1974 | Kenney | F16G 3/00 24/31 W |
| 3,834,245 A | * | 9/1974 | Cultrera | F16G 1/00 474/257 |
| 3,851,536 A | * | 12/1974 | Zeldman | F16G 1/28 474/148 |
| 3,945,178 A | * | 3/1976 | Delfosse | A01D 61/008 56/14.6 |
| 4,295,837 A | * | 10/1981 | Marsh | F16H 7/023 29/892 |
| 4,481,695 A | * | 11/1984 | Koster | F16G 11/12 24/115 H |
| 4,515,577 A | * | 5/1985 | Cathey | F16H 7/023 474/204 |
| 4,540,389 A | * | 9/1985 | Ramsey | F16G 3/06 24/37 |
| 4,553,663 A | * | 11/1985 | Johnson | A01D 61/02 198/465.1 |
| 4,674,803 A | * | 6/1987 | Sterwerf, Jr. | E21C 25/34 299/82.1 |
| 4,690,664 A | * | 9/1987 | Wetzel | B29D 29/08 474/205 |
| 4,717,206 A | * | 1/1988 | Sterwerf, Jr. | E21C 27/26 299/82.1 |
| 4,722,721 A | * | 2/1988 | Wetzel | F16G 1/28 474/153 |
| 4,734,959 A | * | 4/1988 | Jaubert | F16G 3/06 24/37 |
| 4,752,989 A | * | 6/1988 | Jaubert | F16G 3/06 24/37 |
| 4,776,153 A | * | 10/1988 | DePauw | A01D 41/145 56/10.2 E |
| 4,776,828 A | * | 10/1988 | Mashimo | B29D 29/08 474/205 |
| 4,838,843 A | * | 6/1989 | Westhoff | B29D 29/08 474/205 |
| 4,878,886 A | * | 11/1989 | Kitabayashi | F16G 1/28 474/204 |
| 4,899,868 A | * | 2/1990 | Johnson | A01D 61/02 198/520 |
| 4,915,674 A | * | 4/1990 | Tanaka | F16G 1/28 474/153 |
| 5,005,922 A | * | 4/1991 | Edwards | B62D 55/088 305/170 |
| 5,040,282 A | * | 8/1991 | Edwards | B62D 55/088 29/436 |
| 5,099,548 A | * | 3/1992 | Loosli | B65G 15/52 198/844.2 |
| 5,114,001 A | * | 5/1992 | Anderson | F16G 3/06 198/844.2 |
| RE34,485 E | * | 12/1993 | Tanaka | F16H 7/023 474/205 |
| 5,352,488 A | | 10/1994 | Spencer et al. | |
| 5,362,281 A | * | 11/1994 | Dutton | F16G 1/28 474/205 |
| 5,405,299 A | * | 4/1995 | Kubo | F16G 1/28 474/205 |
| 5,419,744 A | * | 5/1995 | Kagebeck | F16B 2/08 474/253 |
| 5,573,470 A | * | 11/1996 | Jakob | F16G 3/00 474/255 |
| 5,956,811 A | * | 9/1999 | Cahannes | D01G 15/24 19/102 |
| 6,131,728 A | * | 10/2000 | Rizhanovsky | F16G 3/08 198/844.1 |
| 6,352,488 B1 | * | 3/2002 | Morris | F16G 1/28 474/260 |
| 6,485,384 B1 | * | 11/2002 | Ochiai | B41J 19/005 474/153 |
| 6,575,862 B2 | * | 6/2003 | Miyaji | F16G 1/28 474/153 |
| 6,843,744 B2 | * | 1/2005 | Gregg | F16G 3/00 474/218 |
| 6,849,016 B2 | * | 2/2005 | Ashtiani | F16G 1/28 474/154 |
| 6,896,124 B2 | * | 5/2005 | Herold | F16G 3/04 198/844.2 |
| 6,896,125 B2 | * | 5/2005 | Webster | B65G 15/52 198/844.2 |
| 7,144,345 B2 | * | 12/2006 | Edamatsu | F16G 1/28 474/205 |
| 7,165,628 B2 | * | 1/2007 | Taylor | A01D 19/04 171/112 |
| 7,412,816 B2 | * | 8/2008 | Coers | A01D 57/20 56/208 |
| 7,650,736 B1 | * | 1/2010 | Salley | A01D 41/16 56/181 |
| 8,070,634 B2 | * | 12/2011 | Gaynor | F16H 55/171 474/153 |
| 8,596,447 B2 | * | 12/2013 | Gentz | B65G 15/52 198/731 |
| 8,635,842 B2 | * | 1/2014 | Markt | A01D 41/14 56/15.2 |
| 8,770,394 B2 | * | 7/2014 | Huels | F16G 3/02 198/844.2 |
| 8,813,465 B2 | * | 8/2014 | Houston | A01D 41/12 56/207 |
| 8,932,165 B2 | * | 1/2015 | Knox | F16G 1/28 474/202 |
| 9,234,563 B2 | * | 1/2016 | Richter | F16G 1/16 |
| 9,506,526 B2 | * | 11/2016 | Moeschen-Siekmann | F16G 3/02 |
| 9,955,628 B2 | * | 5/2018 | Gonzalez-Mohino | A01D 34/003 |
| 10,514,083 B2 | * | 12/2019 | Gregg | F16G 1/10 |
| 2008/0004145 A1 | * | 1/2008 | Duke | B29D 29/08 474/205 |
| 2009/0275433 A1 | * | 11/2009 | Gaynor | F16H 55/171 474/153 |
| 2010/0011729 A1 | * | 1/2010 | Salley | A01D 61/002 56/14.5 |
| 2017/0023101 A1 | | 1/2017 | Jager et al. | |
| 2017/0086365 A1 | * | 3/2017 | Gonzalez-Mohino | B62D 63/02 |
| 2018/0259043 A1 | * | 9/2018 | Pease | F16G 1/08 |
| 2018/0343801 A1 | | 12/2018 | Puryk et al. | |

\* cited by examiner

FLEXIBLE SYNCHRONOUS TOOTHED BELT WITH NARROW SPLICE

FIELD

The field to which the disclosure generally relates is toothed belts useful for harvesting machines, and more particularly to toothed belts used in feederhousings.

BACKGROUND

This section provides background information to facilitate a better understanding of the various aspects of the disclosure. It should be understood that the statements in this section of this document are to be read in this light, and not as admissions of prior art.

Agricultural harvesting machines such as combine harvesters are used to reap, thresh, and winnow grain crops such as wheat, rye, barley, corn, soybeans, oats, flax, sunflower, canola, and the like. More specifically, combine harvesters are used to cut grain crops at the base, separate the grains from the remainder of the plant (the chaff), and sort the grain from the chaff. These machines require special adaptations to accommodate specific crops, navigate through field landscapes, and resist damage from the crops, stone, and the elements; especially moisture and high temperature which can lead to the degradation of the machine's rubber components.

Generally, combine harvesting machines gather crops using a header as the machine moves through a field. The header may be one of several types, each of which provides a means of gathering a particular type of crop. The header is connected to a feederhousing which provides a means of conveying the crop to a threshing mechanism which is part of the harvesting machine.

In one type of header which is useful for small grain, the gathered crops are pushed by a reel into a cutter bar, which runs the length of the header and is equipped with teeth made of metal or plastic to cut crops at their base. Headers may have a rigid or flexible header platform depending upon the operator's needs. Flexible header platforms, or "flex headers" have a cutter bar which is capable of flexing over uneven terrain. Machines using flex headers are most often used to cut soybeans, whereas conventional header platforms have a rigid cutter bar and are most often used to cut cereal crops. Freshly cut crops fall behind the cutter bar and onto a plurality of draper belts which are wrapped around parallel spaced rollers. Draper belts function primarily to consolidate crops and move the crops within the header towards a feederhousing, which then conveys the crops to a threshing mechanism. Alternatively, the freshly cut crop may be conveyed within the header to the feederhousing by augers.

A second type of header is useful for row crops such as corn. This type of header has dividers which define crop gathering gaps for each crop row. In each gap, the ears of corn containing the corn grain kernels is removed from the corn stock and is conveyed by auger or belt to the feederhousing. The stalk and other plant residue are separated from the ears and remain in the field so that the amount of material processed by the threshing mechanism is minimized.

A third type of header is useful for crops which have been previously cut and collected for drying or other aging in the field. This type of header includes a pick-up apron to convey the cut crop into the header and onto a plurality of draper belts which are wrapped around parallel spaced rollers. The draper belts function primarily to consolidate crops and to gently move the crops within the header towards a feederhousing, which then conveys the crops to the threshing mechanism.

For each header type, the feederhousing movably supports the header and connects it to the threshing mechanism contained in the main body of the combine harvester. The feederhousing includes a closed channel, typically of rectangular cross section, having an inlet opening at the forward end which engages the header at the point where the header discharges the crop. The feederhousing has a discharge opening at the rearward end which engages the desired inlet area of the threshing mechanism. The crop is conveyed within the closed channel of the feederhousing from the header to the threshing mechanism by bars or cleats which are attached to chains or belts. The chains or belts are supported by a shaft and sprockets near the discharge opening, and by one or more shafts or drums near the inlet opening. Rotation of the belts or chains about the shafts moves the bars or cleats in a closed loop path from the inlet to the discharge. The moving bars or cleats carry or drag the crop from the header to the threshing mechanism.

Additional mechanisms within the feederhousing may be used to assist the conveyance of the crop. They may guide the path of the bars or cleats or chains, allow limited motion of the drums, and/or control the tension of the chain. The bars and belts or chains are subject to abrasive wear from contact with the crop, and to damage from foreign object that inadvertently enter the feederhousing. Belts made in a continuous loop are difficult to install in a traditional feederhousing, so an assembly of belts and bars in which the continuous loop can be opened for installation is useful.

Inside the threshing mechanism, the grain is separated from the plant stems, cobs, straw, leaves, and chaff. The threshed grains are collected in a grain collecting tank, and the plant waste, or chaff, is moved to discharge openings of the threshing mechanism for disposal to the field or for collection if desired as a secondary product.

Other harvesting machines are used for cutting silage. The header of this machine usually is made to engage with row crops, but instead of striping ears from the stalk, the stalk is cut near the ground and the entire plant is conveyed to the feederhousing. The feederhousing conveys the plant to a chopping mechanism instead of a threshing mechanism to produce animal feed.

Some problems with the use of chains to convey crops within the feederhousing are high weight, excessive noise generation while in operation, chain wear, and chain stretch. Accordingly, there is an ongoing need for improved feederhousing components which improve on the current problems in the art, the need met at least in part, by embodiments according to the disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some embodiments of the disclosure are directed to belts having a cover layer and opposing continuous tooth section defining an outer surface, a cross-linked elastomeric body, and a tensile reinforcement section disposed between the cover layer and the cross-linked elastomeric body. The continuous tooth section includes a plurality of tooth structures, each having tooth flank, a land, and an easement area between the tooth flank and the land, and the easement area has a progressively decreasing radial thickness from the tooth flank to the land. In some aspects, the easement area reduces shear stress between the tensile reinforcement and the elastomeric body of the tooth. In some aspects, the easement area provides a gradual change in belt bending stiffness from a high bending stiffness near the tooth flank to a low bending stiffness near the land. In some aspects, the easement area controls the bending radius of the tensile layer between the tooth flank and the land as the belt engages a sprocket.

In some aspects, the easement area near the land has a low angle of contact with the outer portion of a sprocket tooth when engaging a sprocket, and the low angle of contact may provide a radial or circumferential displacement of the belt with respect to the sprocket when forces applied to the belt tooth flank by the sprocket tooth are excessive, and the displacement of the belt can transfer a portion of those forces to other belt tooth structures of the continuous tooth section, thus limiting the force applied to an individual tooth. In some aspects, the belt is an endless belt, while in some other aspects, the belt is a spliced belt having a splice.

Where the belts are spliced belts, the belt is first made in an open loop containing a desired number of whole teeth along the loop, and with a partial tooth at each end of the loop. When the partial teeth are joined at installation, a splice is positioned in one tooth structure between a pair of corresponding lands. In some cases, the splice may include such elements as a pair of looped cords extending from ends of the tensile reinforcement section, a pair of connectors disposed between the pair of looped cords, a clamp disposed over the pair of connectors and the pair of looped cords on a side of the belt comprising the cover layer, and/or a bottom clamp disposed on an end of the one tooth, where a clamp connector may extend through the clamp and between the pair of glad hand connectors, and where the clamp connector may securely engage the bottom clamp. A deadman may be disposed within each loop of the pair of looped cords, and in some cases, the deadman have a kickstand structure.

Some other embodiments of the disclosure are spliced belts having a cover layer and opposing continuous tooth section defining an outer surface, where the continuous tooth section has a plurality of tooth structures, and where each tooth of the plurality of tooth structures has a tooth flank, a land, and an easement area between the tooth flank and the land. The belt also includes a cross-linked elastomeric body, a tensile reinforcement section disposed between the cover layer and the cross-linked elastomeric body, and a splice positioned in one tooth structure between a pair of corresponding lands. The splice has a pair of looped cords extending from ends of the tensile reinforcement section, a pair of glad hand connectors disposed between the pair of looped cords, a clamp disposed over the pair and the pair of looped cords on a side of the belt having the cover layer, and a bottom clamp disposed on an end of the one tooth. The clamp connector extends through the clamp and between the pair of glad hand connectors, and the clamp connector securely engages the bottom clamp. In some aspects, a deadman is disposed within each loop comprised in the pair of looped cords, and the deadman may have a kickstand structure.

The easement area may have a progressively decreasing radial thickness from the tooth flank to the land, and the easement area may have a low angle of contact with a sprocket at the land end. By extending, within one tooth, the shear area between the tooth and the cord is increased, thus reducing the stress placed on the cord.

Yet other embodiments of the disclosure are directed to feederhousings having a plurality of elastomeric drive belts, where each belt comprised in the plurality of elastomeric drive belts includes a cover layer and opposing continuous tooth section defining an outer surface, a cross-linked elastomeric body, and a tensile reinforcement section disposed between the cover layer and the cross-linked elastomeric body. The continuous tooth section includes a plurality of tooth structures, each having a tooth flank, a land, and an easement area between the tooth flank and the land. The easement area has a progressively decreasing radial thickness from the tooth flank to the land, and may have a low pressure-angle of contact with a sprocket. In some aspects, the belt is an endless belt, while in some other aspects, the belt is a spliced belt having a splice.

Where the elastomeric drive belts are spliced belts, each of the spliced belts further include a splice positioned in one tooth structure between a pair of corresponding lands. The splice may have such elements as a pair of looped cords extending from ends of the tensile reinforcement section, a pair of glad hand connectors disposed between the pair of looped cords, a clamp disposed over the pair and the pair of looped cords on a side of the belt having the cover layer, and/or a bottom clamp disposed on an end of the one tooth. A clamp connector may extend through the clamp and between the pair of glad hand connectors, and the clamp connector may securely engage the bottom clamp. In some cases, a deadman in disposed within each loop of the pair of looped cords, and the deadman may have a kickstand structure.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and wherein.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
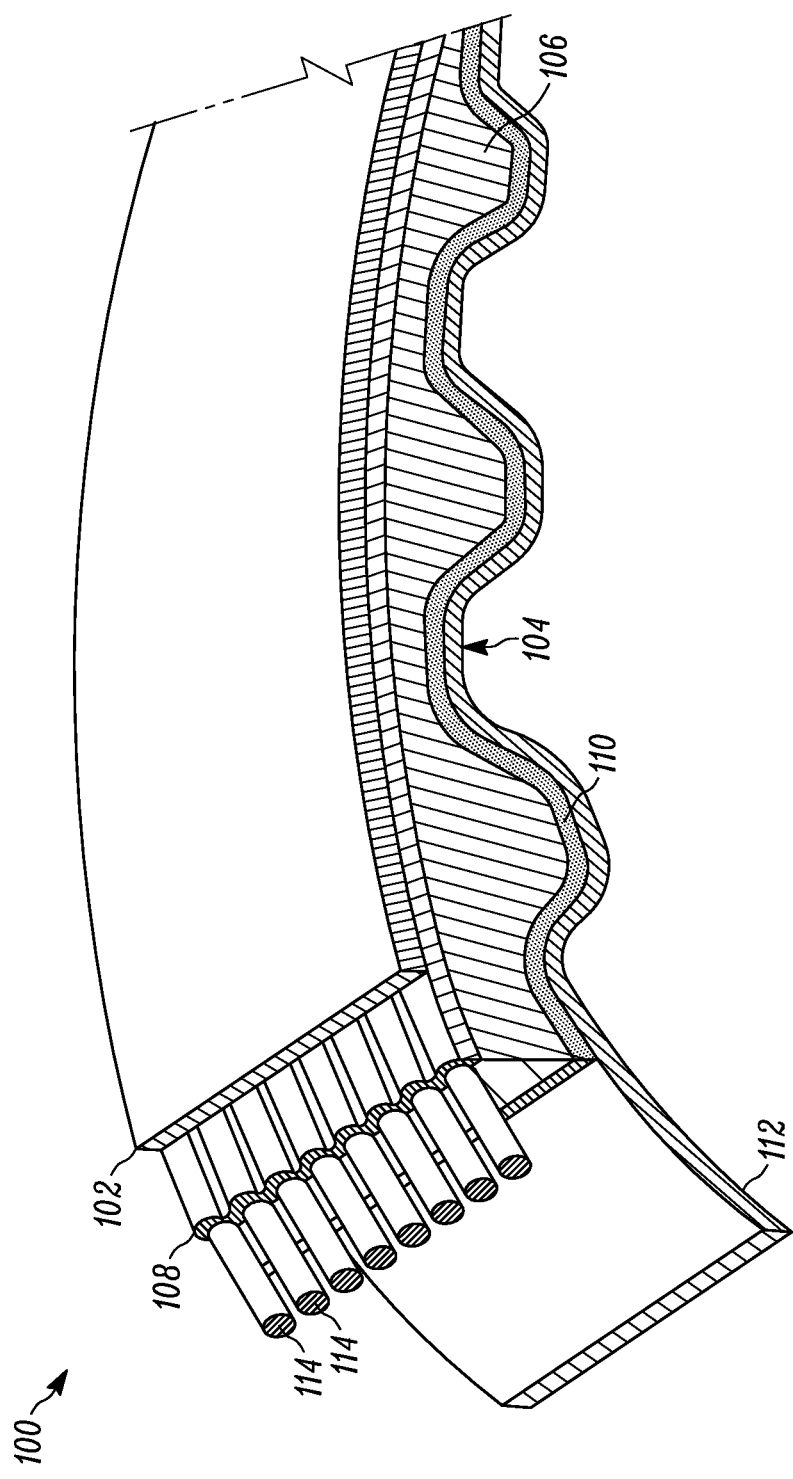
FIG. 1 illustrates a portion of a belt in a fragmented perspective view according to the disclosure.

In general, belts according to the disclosure include a cover layer and opposing continuous tooth section defining an outer surface as depicted in FIG. 1, which illustrates a portion of a belt in a fragmented perspective view according to one embodiment of the disclosure. In some cases, the belts are HNBR (hydrogenated nitrile butadiene rubber) belts where the back side of the HNBR belt is a cover 102 to protect the tensile cords. The cover can be elastomer HNBR or fabric impregnated with elastomer. The tensile cords 114 are embedded in a cord support elastomer 108 which may be the same elastomer as used in the cover 102 or the body 106. It may be a different elastomer if required by the manufacturing process or by functional requirement of the elastomer region near the cords. The body 106 is commonly called the tooth stock elastomer and may not be continuous along the length of the belt. The toothed surface of the belt 104 is usually covered with one or more layers of continuous fabric that follow the contour of the tooth and the land between the teeth. The outer surface of the outer fabric layer 112 may be impregnated with an elastomer with low coefficient of friction and with resistance to abrasion as described in U.S. Pat. No. 8,192,797 B2, the disclosure of which is incorporated herein in its entirety, by reference thereto. The inner surface of the inner layer of fabric may be impregnated with elastomer compatible with the body 106 or the cord encapsulant 108. If more than one layer of fabric is used, the surfaces between the layers may be impregnated with the material of 104, 106, or 108. The tensile cords 114 may be placed close to the inner fabric layer in the land area between the belt teeth and define the neutral plane of the belt in bending.

In some other aspects, the cross-linked elastomeric body 106 is based upon a urethane material, formed from the reaction product of a polyisocyanate and a hydroxyl functional polyol which react during a molding process used in forming belt 100. The polyisocyanate and the hydroxyl functional polyol may be injected separately into the belt mold and reacted during the belt molding process. Further, the polyisocyanate and the hydroxyl functional polyol may envelop the fabric reinforcement prior to reacting during the belt molding process; or in some cases during reacting in the belt molding process. Prior to injection, the belt mold typically contains the outer tension section 102, the tensile reinforcement section 108 and the fabric reinforcement 110 prior to injecting the polyisocyanate and the hydroxyl functional polyol.

However, while the above are just two examples of materials that may be used for the cross-linked elastomeric materials, it is within the spirit and scope of the disclosure to use any suitable material for the cross-linked elastomeric materials. Other non-limiting examples of suitable elastomeric materials include chloroprene rubber ("CR"), acrylonitrile butadiene rubber ("NBR"), styrene-butadiene rubber ("SBR"), alkylated chlorosulfonated polyethylene ("ACSM"), epichlorohydrin, butadiene rubber ("BR"), natural rubber ("NR") and ethylene alpha olefin elastomers such as ethylene propylene terpolymer ("EPDM") and ethylene propylene copolymer ("EPM"), or a combination of any two or more of the foregoing.

The materials forming the elastomeric body 106 and cover layer 102 may be blended with conventional compounding ingredients including fillers, plasticizers, carbon black, agents to reduce static build up, stabilizers, vulcanization agents/curatives and accelerators, in amounts conventionally employed.

The tensile reinforcement section 108 disposed between the outer tension section and the cross-linked elastomeric body is useful for providing support and strength to belts. In some embodiments, the tensile reinforcement section 108 contains a plurality of cords 114 aligned longitudinally along the length of main body portion. It should be understood that, in general, any type of tensile reinforcement section known to the art may be utilized. Moreover, any desired material may be used as the tensile members in the tensile reinforcement section, such as cotton, rayon, nylon, polyester, aramid, steel, carbon fiber, PBO, and even discontinuous fibers oriented for low load carrying capability. In some aspects, the cords are embedded in a material, the embedding material being an elastomeric material.

Figure 2:
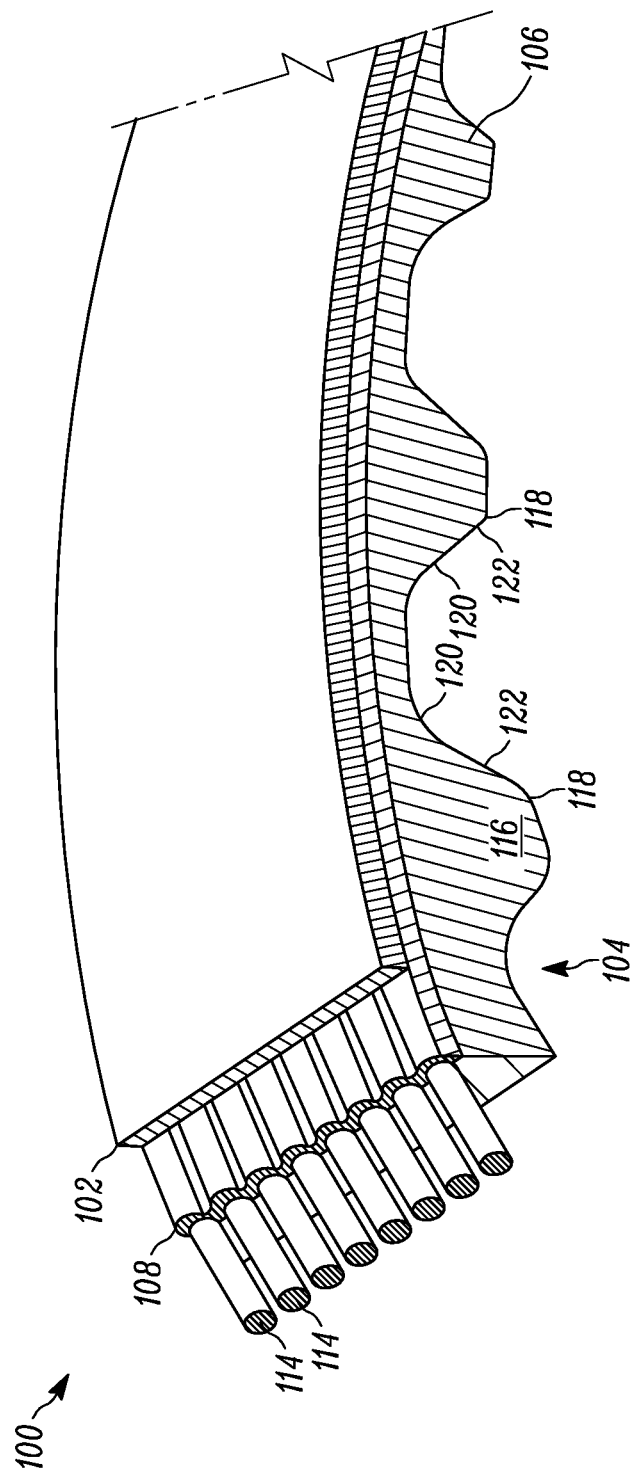
FIG. 2 depicts a portion of a belt in a fragmented perspective view according to another aspect of the disclosure.

As depicted in FIG. 2, continuous tooth section 104 has a plurality of tooth structures. Each tooth 116 of the plurality of tooth structures includes tooth flanks 118, lands 120, and easement areas 122 between the tooth flanks 118 and the lands 120, which is illustrated in FIG. 2. According to embodiments of the disclosure, the easement areas 122 have a progressively decreasing radial thickness from the tooth flanks 118 to the lands 120. The easement area 122 of the tooth profile may serve to support the plurality of cords 114 on a curve, as well as improves fatigue life of plurality of cords 114 by preventing small bend radiuses in the plurality of cords 114, as belt 100 engages and bends around a sprocket.

At constant cord tension, the neutral plane does not get shorter or longer as the belt is bent around a sprocket. The tensile cords 114 are straight in the area above the tooth, the easements and the land between teeth when the belt is under tension between sprockets or other supports. The tensile cords 114 above the tooth may be straight or curved when the belt under tension is bent around a sprocket, depending on the bending stiffness of the belt in the area of the tooth. In the absence of an easement 122, the tensile cords 114 above the land 120 may be bent to the radius of the top of the sprocket tooth, in an arc with total angle equal to the angle between adjacent belt teeth. The arc radius is much less than the outer radius of the sprocket teeth, and fatigue damage to the cord 114 is increased in the land area 120. With the easement 122 present, the cord 114 is supported at a gently decreasing radius from the tooth flank to the land, and the arc length at the land is reduced to near zero, resulting in reduced fatigue of the cord 114. The support of the cord 114 in the easement area 122 is partially due to the variable bending stiffness of the belt 100 in the easement area 122, which also supports the cord 114 if the belt is bent around a flat drum instead of a sprocket. When the belt is bent around a sprocket, the support of the cord 114 in the easement area 122 is also due to decreasing radial thickness of the easement 122 from the tooth flank to the land which conforms to the flanks 118 of the sprocket tooth as the belt 100 is bent.

Figure 3:
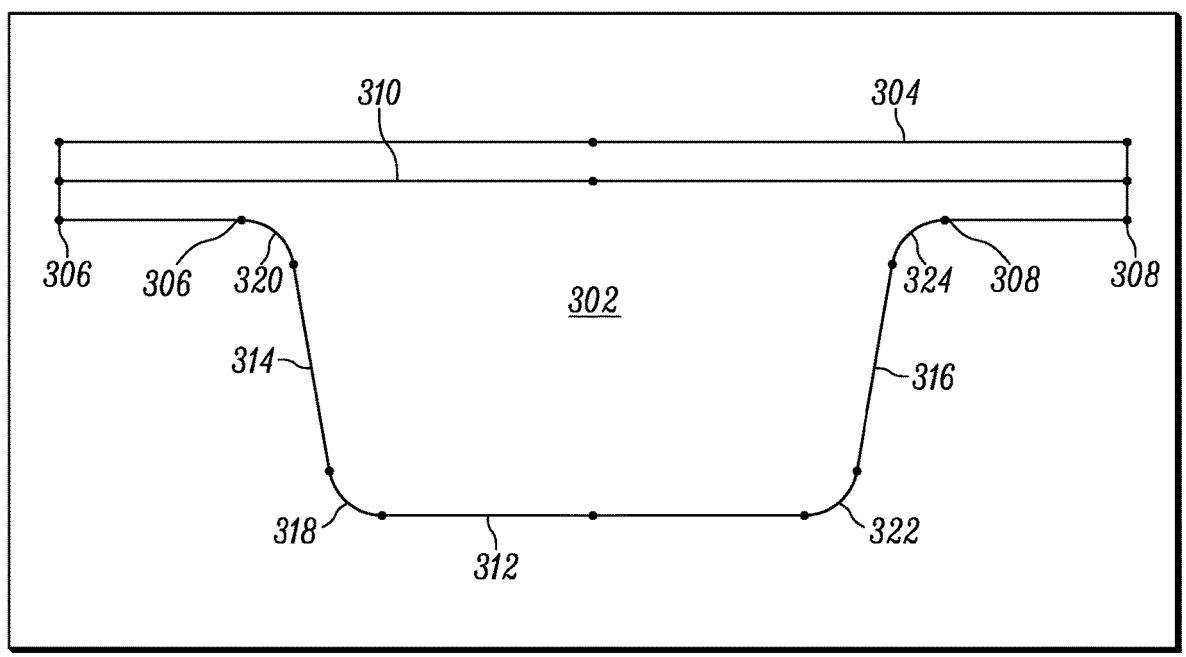
FIG. 3 shows a portion of a convention belt in rack form, in a cross-section view.

Now referencing FIG. 3, which illustrates in a portion of conventional toothed belt in rack form (the neutral plane is a straight line). FIG. 3 shows one belt tooth 302, top surface 304 of the belt and a portion of the belt lands 306, 308 between the teeth on either side of the tooth 302. Line 310 is the neutral plane of the belt which would be near the center of tensile cords. The trapezoidal tooth 302 defines bottom 312. The tooth 302 also defines flanks 314, 316 of the trapezoidal tooth, which are joined to the lands 306, 308 and tooth bottom 312 with fillet curves 318, 320, 322, 324. In one non-limiting example, the belt has a tooth pitch of 50 mm, neutral plane 310 to lands 306, 308 of 1.7 mm, and neutral plane 310 to top surface 304 of 1.5 mm.

Figure 4:
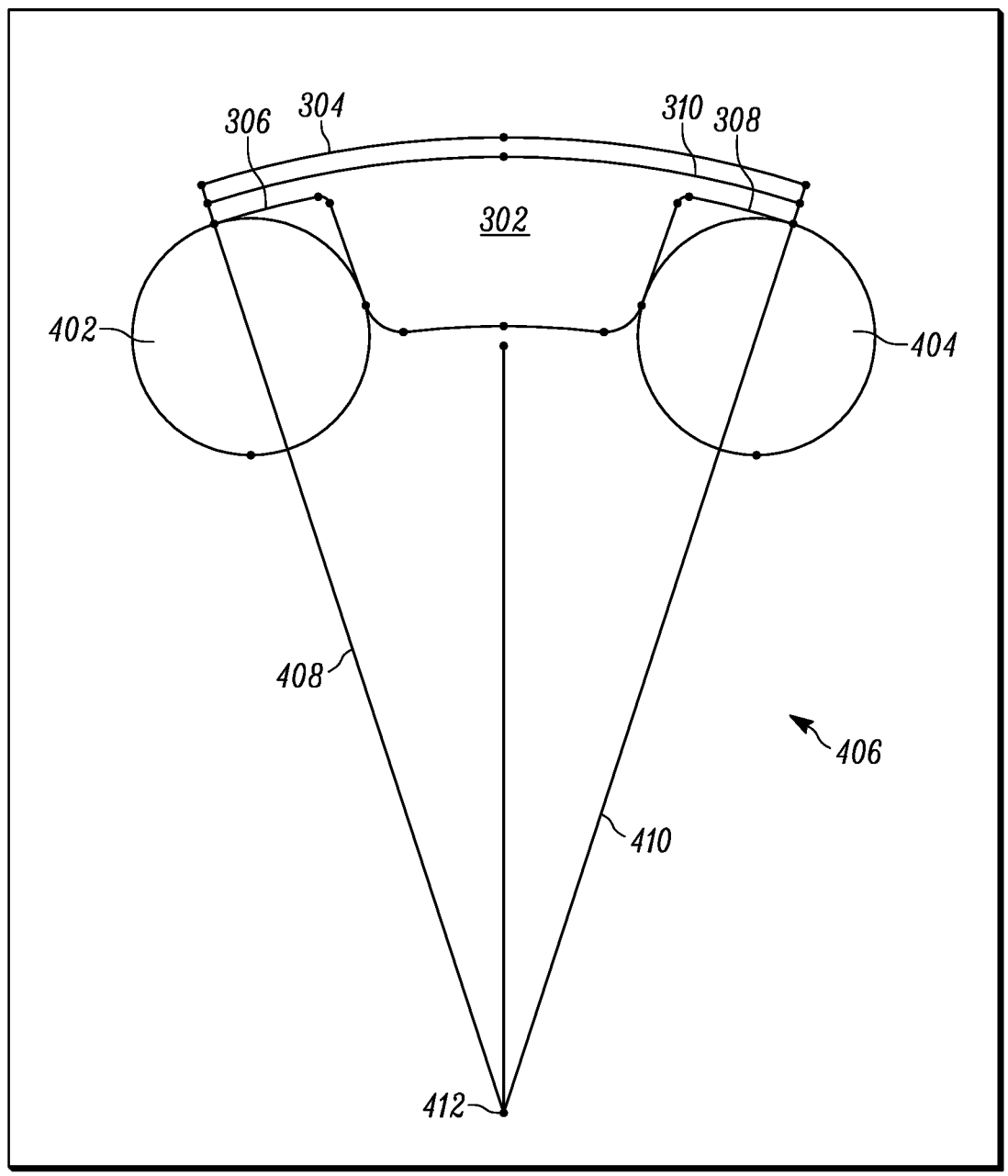
FIG. 4 depicts a section of the trapezoidal toothed belt shown in FIG. 3, when wrapped around a sprocket in an ideal form, in a cross-section view.

FIG. 4 depicts a section of the trapezoidal toothed belt shown in FIG. 3, when wrapped around a sprocket in an ideal form. Two cylindrical teeth 402, 404 on sprocket 406 are shown. The angled lines 408, 410 passing through the two cylindrical teeth 402, 404 represent one pitch of sprocket 406 and meet on the center 412 of sprocket 406. The belt also defines top surface 304 and neutral plane 310 which is near the center of tensile cords. The belt tooth 302 and lands 306, 308 are deformed into an idealized shape where the lands are in contact with the outer diameter of sprocket 406, and the lands 306, 308 as well as belt tooth 302 are curved so that the belt neutral plane 310 is an arc with constant radius centered at the center 412 of the sprocket 406. The bending radius of cords is the sprocket outside radius plus the belt neutral plane to land distance. This the condition which provides the largest possible cord bend radius for the given sprocket size (pitch and number of teeth). For example, where the belt tooth pitch is 50 mm, neutral plane to land is 1.7 mm, neutral plane to top is 1.5 mm, sprocket pitch is 50 mm, and number of teeth is 10, the tooth-to-tooth angle is 36°, having half angle of 18°, sprocket pin outer diameter is 20 mm, cord bend radius is 79.577 mm and pitch line arc length is 50 mm.

Figure 5:
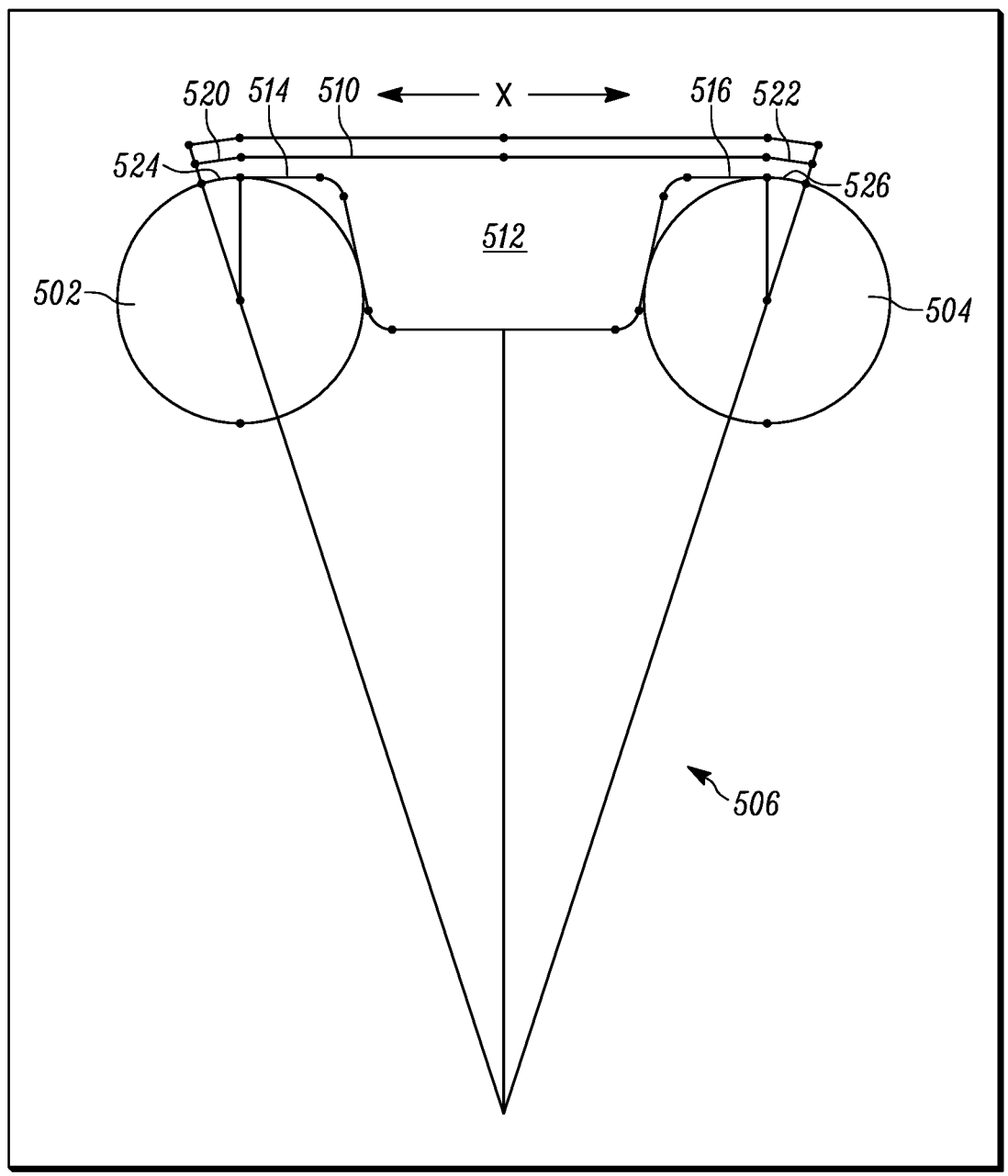
FIG. 5 illustrates a section of the trapezoidal toothed belt, such as that shown in FIG. 3, when wrapped around a sprocket in a form that has an undesirably small cord bending radius, in a cross-section view.

Now referencing FIG. 5, which illustrates a section of the trapezoidal toothed belt, such as that shown in FIG. 3, when wrapped around a sprocket 506 in a form that has an undesirably small cord bending radius, and where the belt land wraps around the cylindrical teeth 502, 504 of the sprocket 506, at regions 520, 522. Here, the belt cords, positioned about belt neutral plane 510, are under tension, which pulls the unsupported belt tooth 512 and parts of the lands 514, 516 into a chordal straight-line X. The tension also holds part of the lands at regions 524, 526 in an arc around the outer diameter of the cylindrical sprocket teeth 502, 504. The minimum bending radius of the cord is the radius of the sprocket pin plus the belt PLD neutral plane to land, which is significantly smaller than that depicted in FIG. 4, and, for example, in comparison, has a cord bend radius of 11.7 mm at arc of 36° with a ten tooth sprocket.

Figure 6:
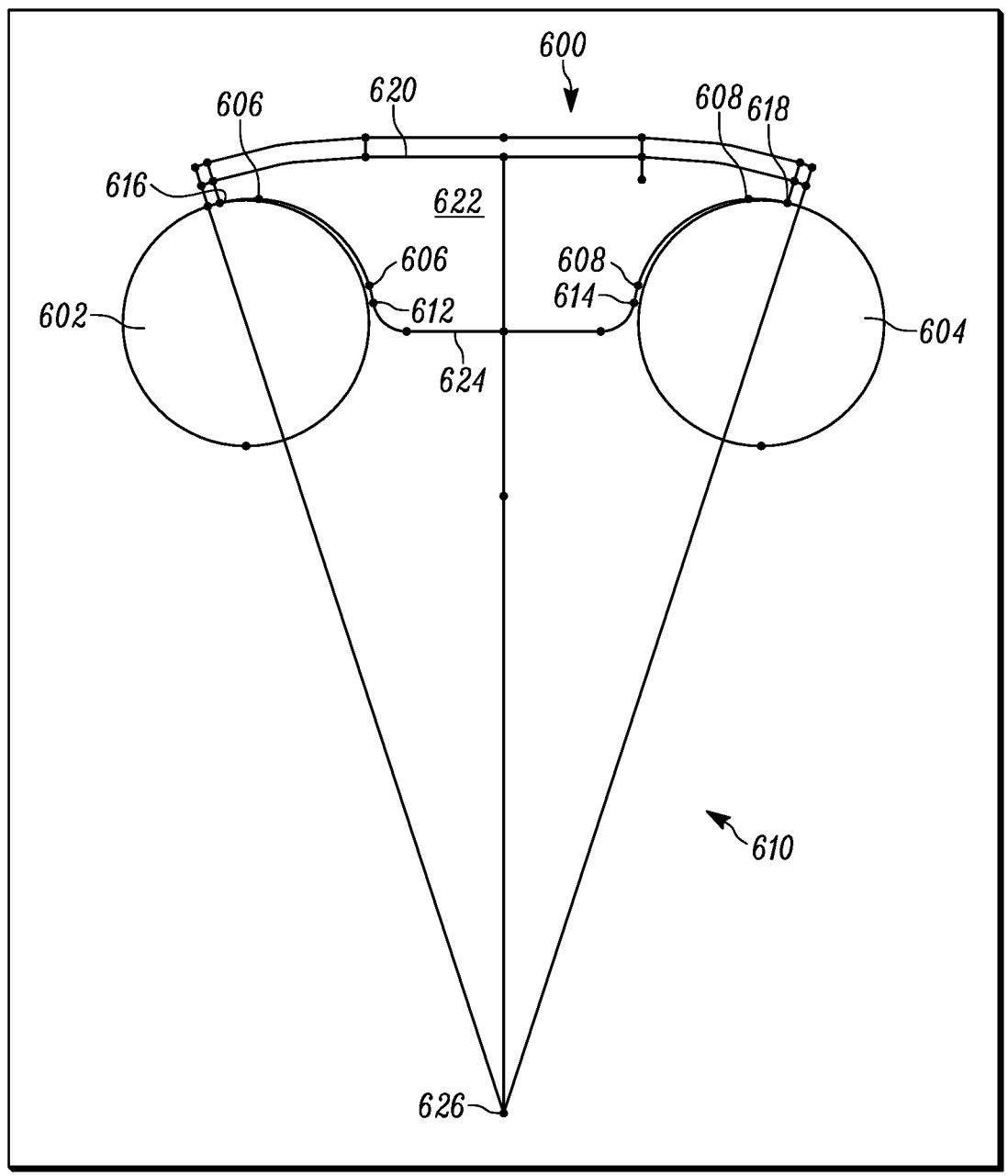
FIG. 6 shows a section of a toothed belt according to the disclosure, when wrapped around pins of a sprocket, in a cross-section view.

FIG. 6 depicts a section of a toothed belt according to the disclosure, when wrapped around pins of a sprocket. As shown, toothed belt 600 includes easements 606, 608 wrapped around pins 602, 604 of sprocket 610. The easements 606, 608 are a transition area between the belt tooth flank 612, 614 and the land 616, 618, which significantly shorten the length of the land, between teeth, in comparison to that shown FIG. 5. Such easements 606, 608 prevent the undesirably small cord bending radius of FIG. 5 where the land 514, 516 wraps around the sprocket tooth pin 502, 504. The belt cords, positioned about belt neutral plane 620, are under tension and the bending stiffness of the belt 600 in the tooth 622 area may hold the cord above the tooth 622 in a straight chordal line or in a slight curve with a significantly larger cord bending radius than that depicted in FIG. 5. The bottom 624 of the tooth 622 is unsupported. Further, easement 606 or 608 can be defined as a belt structure as having a progressively decreasing radial thickness, relative sprocket 610 center point 626, between tooth flank 612, 614 and land 616, 618 respectively. This is contrast to that depicted in FIG. 5 where there exists a gap between a significant portion of the land and tooth flank relative the sprocket pin surface, as well as a consistent radial thickness over a majority of the land length, with an steep increase in radial thickness from the land to tooth flank (or otherwise a steep decrease in radial thickness between tooth flank and land). In another aspect, the radius of the belt at easement 606 or 608 are like or similar to the radius of the sprocket pin 602 or 604.

Each easement area 606, 608 acts as a tapered cantilever beam to support the cord at a variable radius, until the easement 606, 608 deforms to contact the sprocket pin 602, 604. Upon contact between the sprocket pin 602, 604 and the lower surface of the easement 606, 608, the cord bending radius is determined by the radial thickness of the deformed easement 606, 608 at each point between the tooth flank 612, 614 and the small remaining land 616, 618. The narrow land is in contact with the sprocket at the outer diameter of the sprocket pin, but the arc of contact is very small and the curve of the cord over the easement brings the cord tangent to the cord at the end of the easement of the next tooth. The minimum bend radius of the cord is much greater than the minimum radius shown in FIG. 5.

In some aspects, belts according to the disclosure, having easement area designs which reduce the peak shear stress and increased tooth fatigue life due to larger shear area, may be useful in an endless belt where the drive shaft(s)/sprockets are removeable from the equipment in which the belt is used. In some other aspects, the belts according to the disclosure may be spliced belts which are installed in equipment without removal of drive shaft(s)/sprockets.

Figure 7:
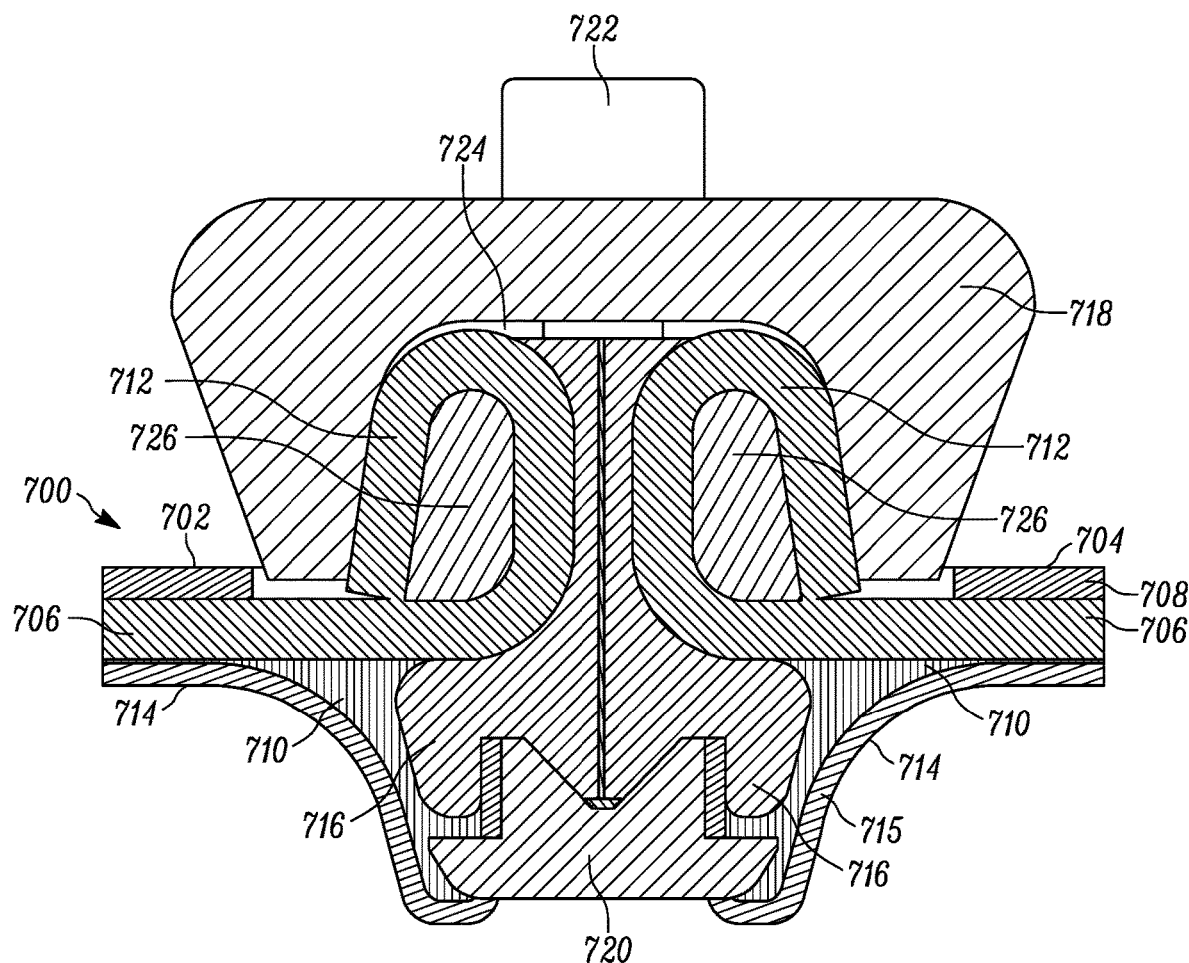
FIG. 7 shows a splice of a spliced belt, in a cross-section view according to the disclosure.

Now referencing FIG. 7, which depicts a splice of a spliced belt, in a cross-section view. In this embodiment, spliced belt 700 includes a first end 702 and opposing second end 704. A tensile reinforcement section includes a plurality of cords 706, disposed between a cover layer 708 and a cross-linked elastomeric body 710. Cords 706 extend from both first end 702 and opposing second end 704. The extended portion of the pair of cords 706 are each looped to form looped cords 712, which are positioned in a tooth structure of spliced belt 700, between a pair of corresponding lands 714. An optional fabric layer 715 may be disposed on the outer surface of the tooth structure, or slightly inward therefrom. A pair of glad hand connectors 716 are disposed between the pair of looped cords 712, and a clamp 718 disposed over the pair of looped cords 712 on a side of the belt 700 where the cover layer 708 is located. A bottom clamp 720 is disposed on an end of the tooth structure, and a clamp connector 722 extends through the clamp 718 and between the pair of glad hand connectors 716, and the clamp connector 722 securely engages the bottom clamp 720. After assembling the splice, an air space compression zone 724 may remain outwardly from looped cords 712. In some aspects, a deadman 726 is disposed within looped cords 712.

Ends 702 and 704 are two ends of the same belt, and each end contains one half of the tooth, including one deadman 726, and one septum (716). FIG. 7 shows slightly more than one pitch and includes only the two half-tooth ends with the septums in contact, along with the top 718, bottom clamp 720 and connector 722. Bottom clamp 720 interferes with the tooth fabric and rubber in this assembled view. The looped cords are shown as turned in a 270 degree loop, which, as tension in the cords 706 increases, the loops provide a self-activating increase in the clamping force on the end of the cord loop between the deadman 726 and upper clamp 718. In some other aspects of the disclosure, the loops could be turned in any suitable amount, such as, but not necessarily limited to, 45 degrees, 90 degrees, 180 degrees, or even 360 degrees.

Figure 8:
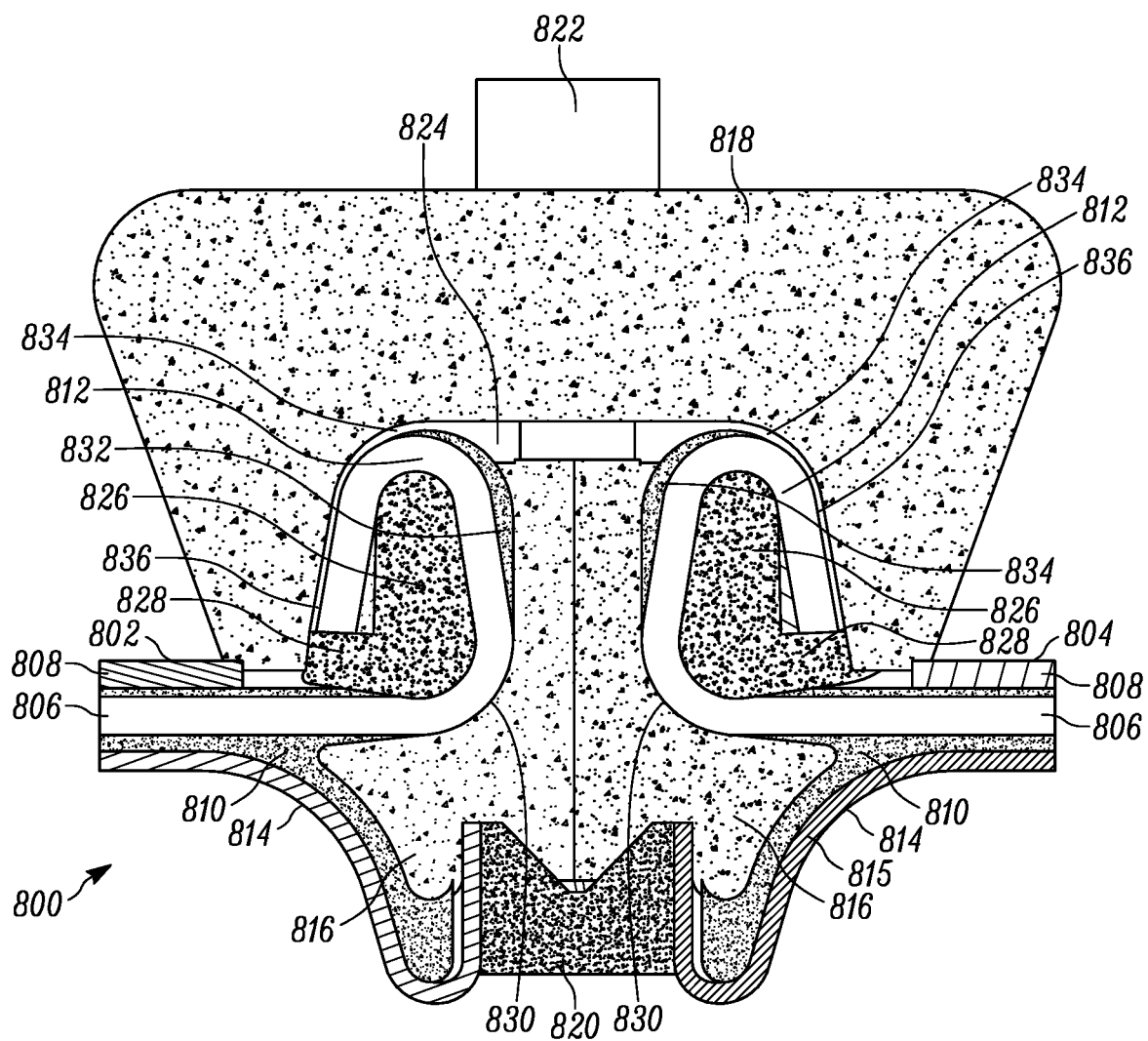
FIG. 8 depicts another splice of a spliced belt, in a cross-section view according to the disclosure.

With reference to FIG. 8, which depicts another splice of a spliced belt, in a cross-section view in accordance with the disclosure, and in this embodiment, spliced belt 800 includes a first end 802 and opposing second end 804. Similar to above, tensile reinforcement section includes a plurality of cords 806, disposed between a cover layer 808 and a cross-linked elastomeric body 810 where cords 806 extend from both first end 802 and opposing second end 804. The extended portion of cords 806 are each looped to form looped cords 812, positioned in a tooth structure of spliced belt 800, between a pair of corresponding lands 814. An optional fabric layer 815 may be disposed on the outer surface of the tooth structure, or slightly inward therefrom. A pair of glad hand connectors 816 are disposed between the pair of looped cords 812, and a clamp 818 disposed over the pair of looped cords 812. A bottom clamp 820 is disposed on an end of the tooth structure, and a clamp connector 822 extends through the clamp 818 and between the pair of glad hand connectors 816, and the clamp connector 822 securely engages the bottom clamp 820, while an air space compression zone 824 remains outwardly from looped cords 812. A deadman 826 is disposed within looped cords 812.

Deadman 826 includes a kickstand 828. The kick stands 828, glad hands 816 and mold used to form the belt end confine the deadman 826 and displace rubber encapsulating the cord 826 to create pinch points and glands. The first pinch point 830 is just above the 90-degree cord bend from horizontal to vertical, and the first gland 832 is above the first pinch point 830. A second pinch point 834 is in the 180-degree bend at the top. The cut end of the cord ends at the top of the kickstand 828 in the second gland 836. With 270 degrees of wrap, increasing the tension in the cords causes the deadman 826 to rotate when the cord and elastomer in the gland area 832 deforms. The kickstand 828 limits the rotation movement of the deadman 826 so that it is not separated from the septum 816 and overall pitch of the spliced tooth is accurately maintained.

Figure 9:
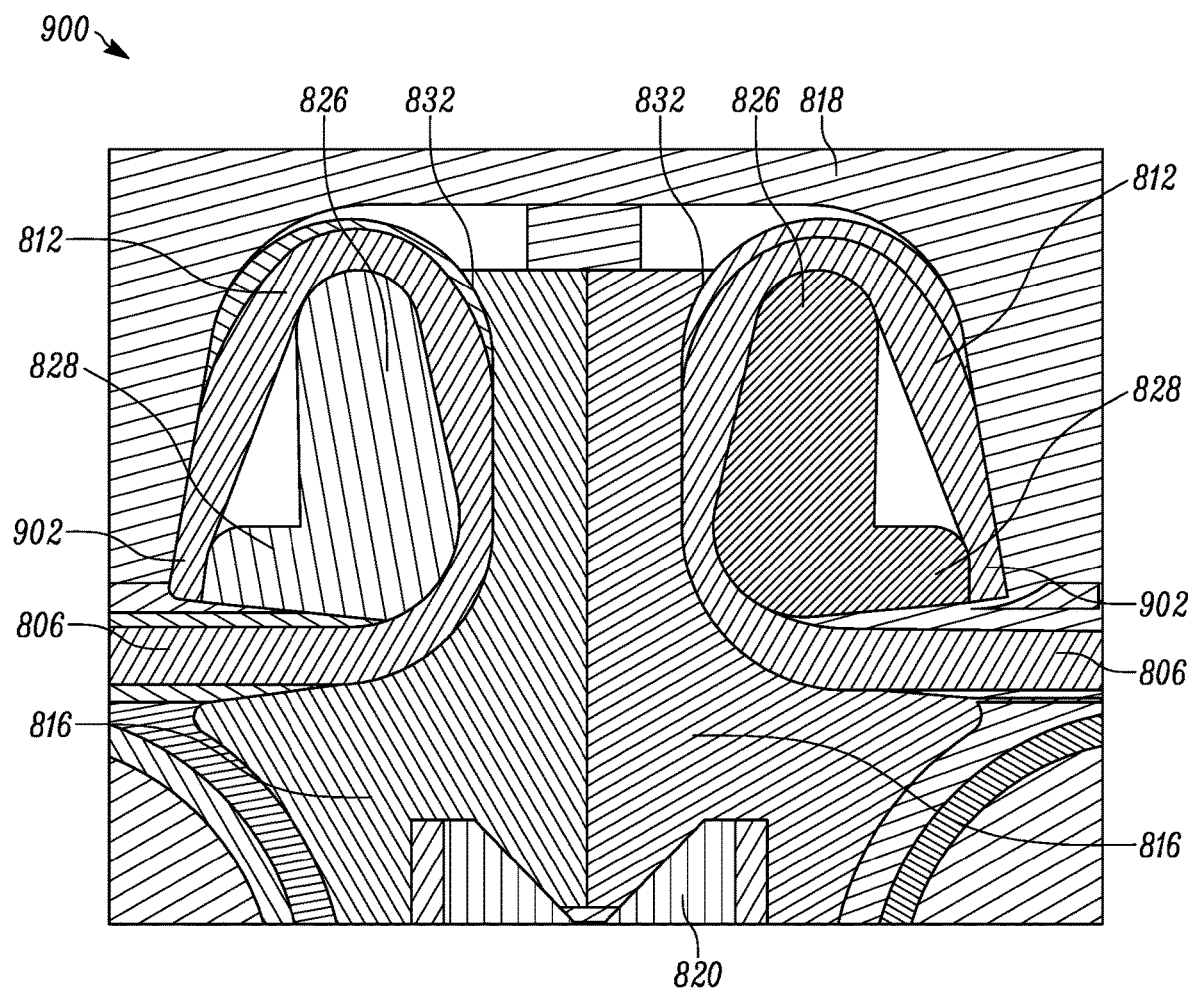
FIG. 9 illustrates another splice of a spliced belt, in a cross-section view according to the disclosure.

Now referencing FIG. 9, which depicts yet another splice of a spliced belt, in a cross-section view. In this embodiment, spliced belt 900 includes almost all of the same elements as shown in FIG. 8 for spliced belt 800. However, ends of the cords are extended to be pinched between the deadman kickstand and the clamp. As depicted, the extended ends 902 from cord loops 812, of cord 806, is disposed between deadman 826 kickstands 828 and the clamp 818, or otherwise extended over the tip of the kickstands 828 to clamp the ends of cord 806. Initial clamping force is provided by top clamp 818 when securely connected to bottom clamp 820 via the clamp connector. When belt 900 tension increases, the cord 806 tension in a first bend increases the clamp force between the tip of kickstand 902 and clamp 818. Rotation of the deadmans 826 is prevented by the pinch point and the contact of the cord ends 902 and encapsulating rubber in the first glands 832 against glad hands 816. In FIG. 8, the adhesion and compression of the cord and elastomer in gland 836 resist any tension in the cord near the end of the loop. However, in FIG. 9, both the cord clamping effect of FIG. 7 and the limiting of deadman rotation by the kickstand in FIG. 8 are combined and gland 836 has the proper tapered shape.

The glad-hands shown on the above figures are formed of a pair of septums which are essentially symmetric with an interlocking feature. The septums can be brought in contact from the left and right with vertical and horizontal alignment controlled by glad-hand pins and sockets, after which the top and bottom clamp can be applied.

Figure 10:
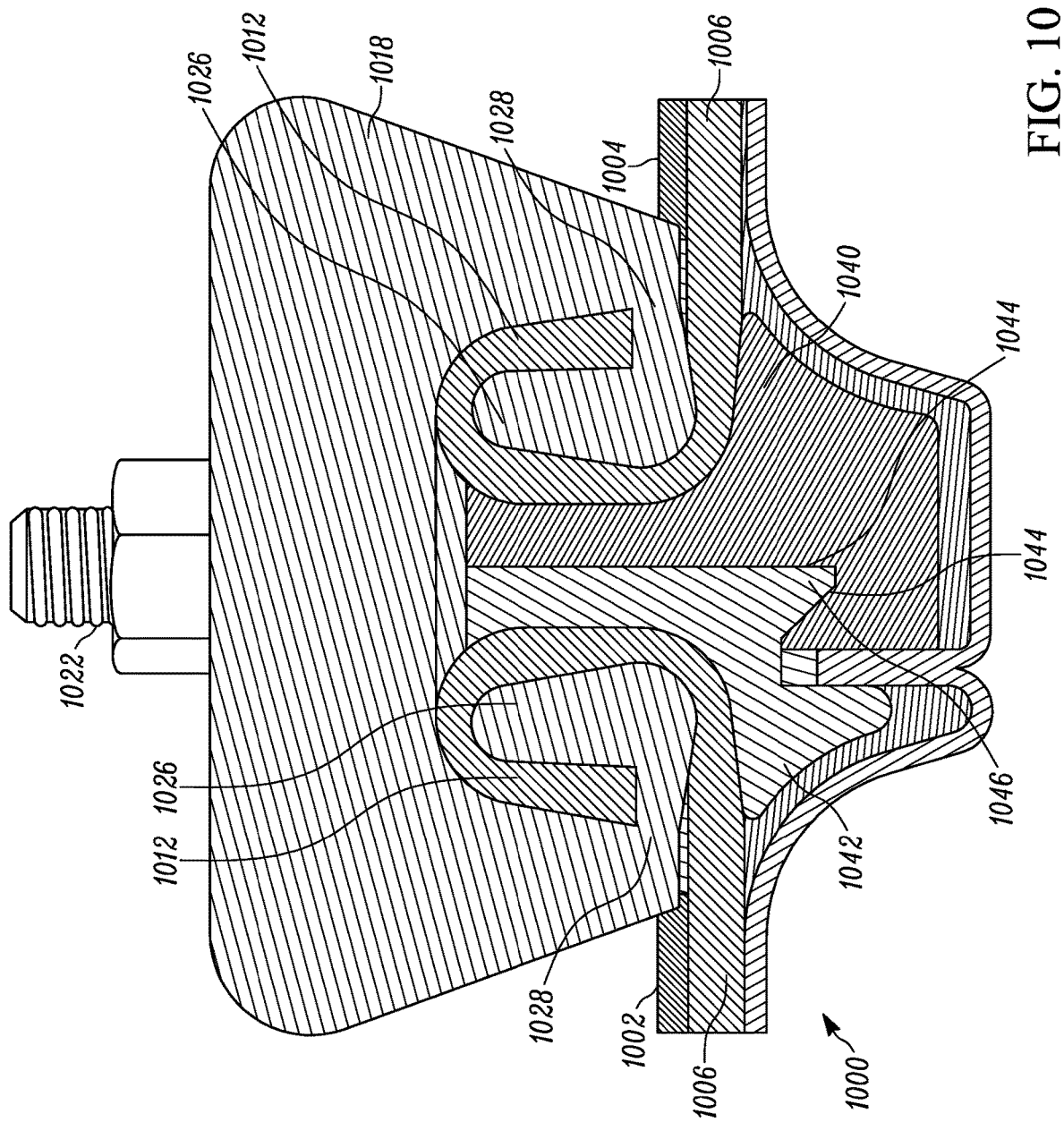
FIG. 10 shows another splice of a spliced belt, in a cross-section view according to the disclosure.

With reference to FIG. 10, which depicts another splice of a spliced belt, in a cross-section view in accordance with the disclosure. In this embodiment, spliced belt 1000 includes many of the same elements as described in the embodiments above including a first end 1002 and opposing second end 1004, a plurality of cords 1006, where extended portion of cords 1006 are each looped to form looped cords 1012, and a clamp 1018 disposed over the pair of looped cords 1012. However, asymmetrical septum connectors 1040 and 1042 are disposed between the pair of looped cords 1012, and beneath clamp 1018 disposed over the pair of looped cords 1012. Deadmans 1026 with kickstands 1028 are disposed within looped cords 1012. The bottom clamp mechanism is incorporated into septum connector 1040 and clamp connector 1022, as a part of septum connector 1040, extends up between and between asymmetrical connectors 1040, 1042, and through clamp 1018, and is secured to clamp 1018 with a fastener. Asymmetrical septum connectors 1040 and 1042 may have corresponding mating interlocking features 1044 and 1046.

In contrast with the above figures, the septums 1040 and 1042 in FIG. 10 are not a glad-hand design (i.e. symmetrical septums). Also, here a bottom clamp is incorporated in septum 1040, and the septums 1040 and 1042 cannot be brought in contact from the left and right unless septum 1040 is lower than septum 1042 so that the interlocking features 1044 and 1046 do not interfere. After the septum faces touch, the septum 1040 must be slid upward to the same height as 1042. The vertical alignment is dependent on the engagement of interlocking features 1044 and 1046.

Tensile testing was conducted on some belts according to the disclosure, as well as some conventional design control belts. Each tested belt sample was 70 mm wide. Belt sample N-1, from Table 1 was a straight tensile test of a belt strand without a splice, such as a test for an endless belt. Belt sample L-1 had a lap splice extending over 4 teeth in length. For belt sample L-1 one belt strand was cut to have a 35 mm wide groove on the strand centerline, and the second strand was cut to have a 35 mm wide tongue on the centerline. The tongue of the second strand was placed inside the groove of the first strand. The tongue and groove were connected by metal clamps at the centerline of each of 4 teeth.

Belt samples D-1 to D-5 and K-1 to K-5 were butt splices of the belt strand having the features of holding the ends of the cords by wrapping around a deadman and capturing the belt ends with top and bottom clamps, as described above for embodiments according to the disclosure. Belt samples D-1 to D-5 were similar to shown in FIG. 7, where the deadman does not have a kickstand and where the path of the cables and encapsulating elastomer is relatively uniform in thickness.

Belt samples K-1 to K-5 were similar to embodiments shown in FIGS. 8-9, where the deadman does have a kickstand and where the path of the cables and encapsulating elastomer varies in thickness to bring the cables closer to the deadman at the pinch points and to provide a tapered gland of encapsulating elastomer between the pinch points. For belt samples K-1, K-4 and K-5, the ends of the cables are captured by a pinch point between the top clamp and the kickstand of the deadman, as shown in FIG. 9.

The belt samples tested in pairs by clamping them together and applying a tensile load to the free ends. The specimen which fails at the lowest tension is shown in the table. Belt sample K-4 was tested with K-5, and did not fail.

TABLE 1

| Specimen | Tension at break (lbf) | SPLICE TYPE |
| --- | --- | --- |
| N-1 | 23,191 | NONE-BELT STRAND |
| L-1 | 4,883 | LAP SPLICE |
| D-1 | 8,465 | DEAD MAN |
| D-2 | 5,008 | DEAD MAN |
| D-3 | 8,080 | DEAD MAN |
| D-4 | 10,736 | DEAD MAN |
| D-5 | 6,000 | DEAD MAN |
| K-3 | 10,946 | KICKSTAND |
| K-2 | 11,725 | KICKSIAND |
| K-1 | 14,262 | KICKSTAND |
| K-4 | 14,294 | KICKSTAND |
| K-5 | 14,294 | KICKSTAND |

Belts according to the disclosure may be used in any suitable application or equipment where the advantages of such belts provide improvement over the conventional belts used. One nonlimiting example of such equipment is a combine crop harvester feederhousing.

Figure 11:
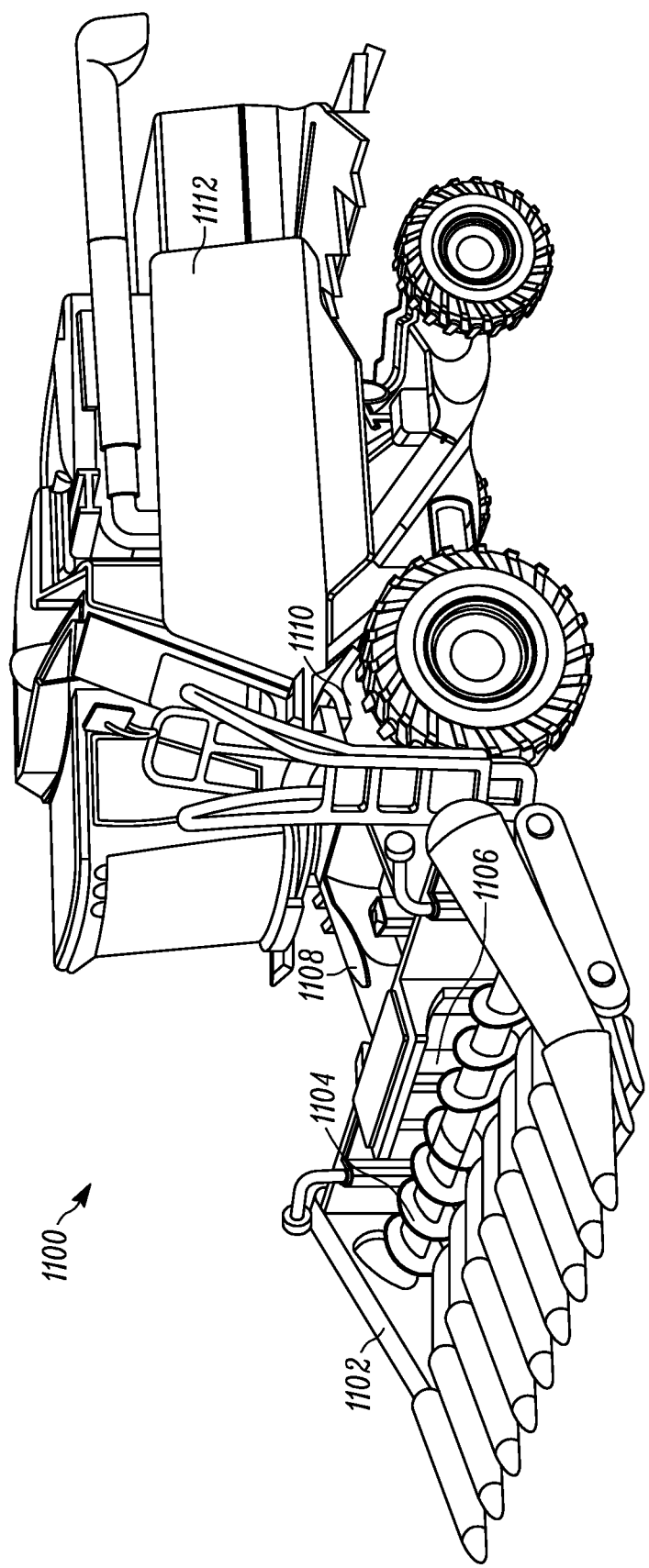
FIG. 11 depicts a combine harvester, in a perspective view according to the disclosure.

FIG. 11 depicts one example of a conventional combine crop harvester 1100, in perspective view, which is equipped with a removable head 1102, this is designed for particular crops. Shown is a corn head 1102, but other types include a grain platform, a flex head which can cut soybeans as well as cereal crops, wheat headers, also called "draper" headers, and the like.

Harvesting head 1102 includes an auger 1104 for conveying harvested crop from each side toward center 1106, where it then enters feederhousing 1108. The crop is carried up the feederhousing 1108 by one or more belts and flight elevator, then fed into the thresher 1110 having the threshing mechanism of the combine 1100, which generally includes a rotating threshing drum to which rasp bars are bolted, to separate the crop and chaff. After primary separation at the drum, the clean crop falls through a concave and to a shoe, and thereafter lifted to container 1112.

Figure 12:
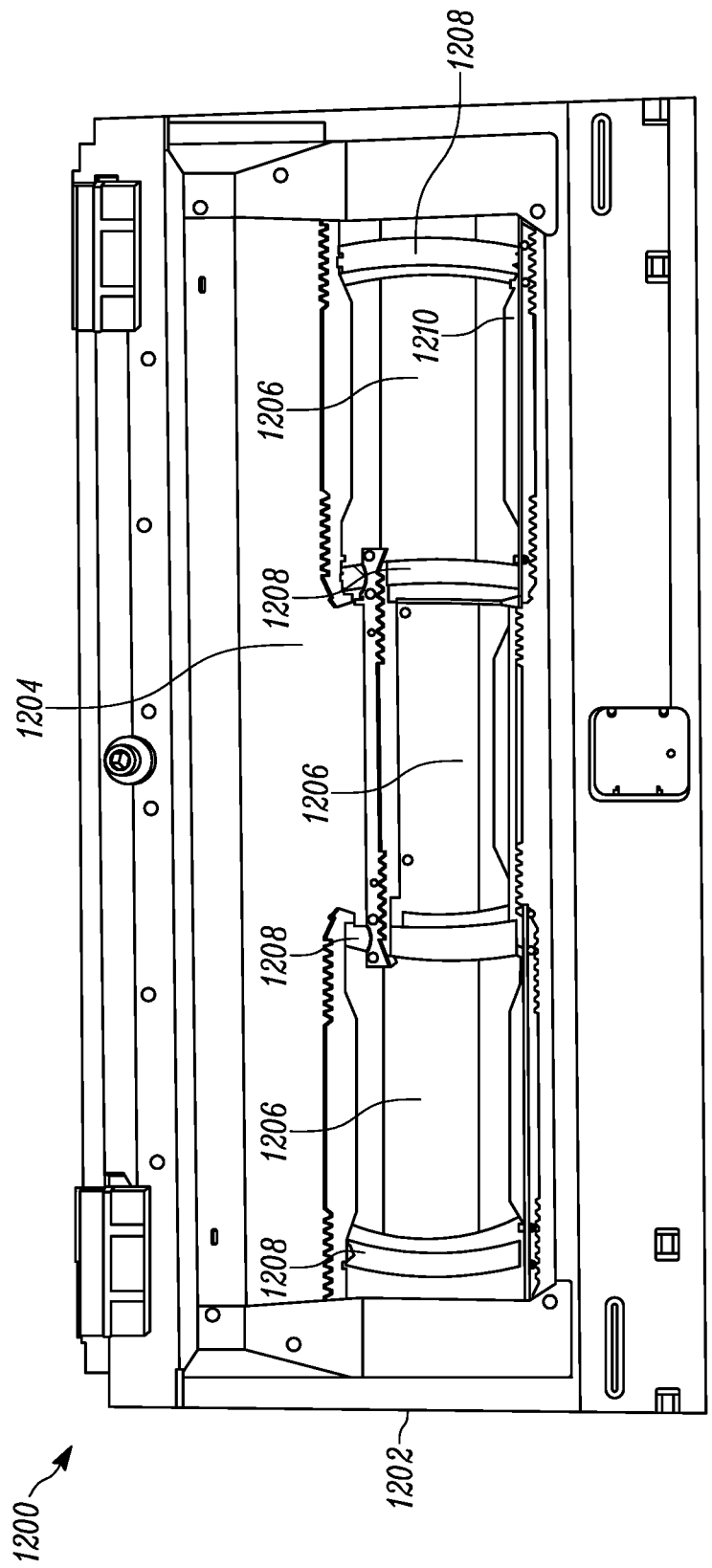
FIG. 12 illustrates the front side of a feederhousing, according to an aspect of the disclosure; and, FIG. 13 shows a feederhousing mid-frame, in a perspective view, according to another aspect of the disclosure.

Now referencing FIG. 12, which shows a front view of a feederhousing 1200, where harvested crop is received and concentrated. Feederhousing 1200 generally includes an outer housing structure 1202 which defines a hollow 1204 therein. A feed drum 1206 is disposed within hollow 1204 and rotatably attached to outer housing structure 1202. Feed drum 1206 is rotated by belts 1208, and attached to belts 1208 are conveyor belt slats 1210 (five shown). The feed drum 1206, belts 1208 and conveyor belt slats 1210 are part of a larger structure called a mid-frame, an example of which is showing in FIG. 13.

Figure 13:
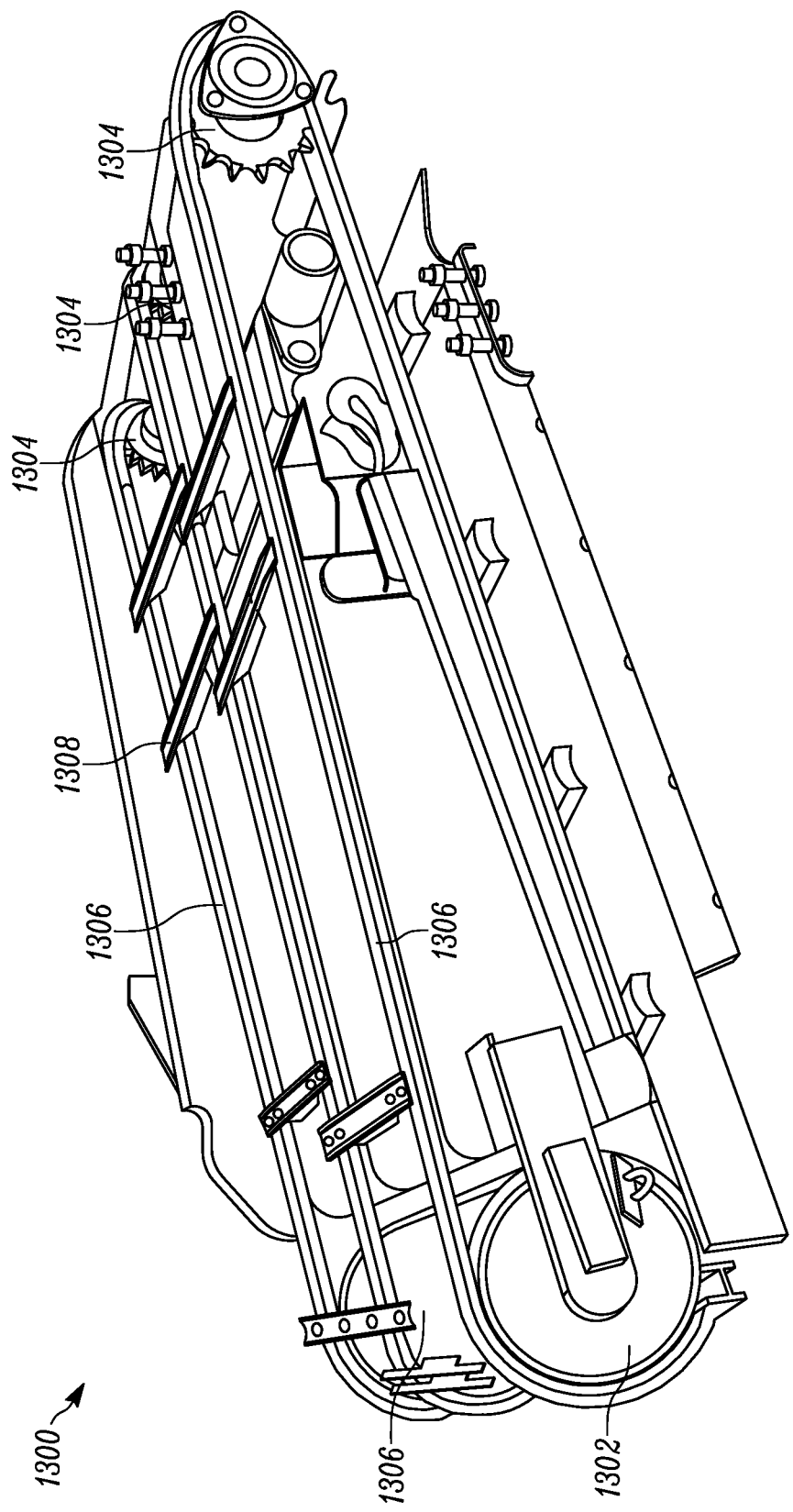

With reference to FIG. 13, a feederhousing mid-frame is shown in a perspective view. Mid-frame 1300 includes feed drum 1302 which is attachable to an outer housing structure (not shown), and an axle with drive sprockets 1304. Belts 1306 are connected to both feed drum 1302 and corresponding drive sprockets 1304. Attached to belts 1306 are conveyor belt slats 1308 (ten shown).

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:
1. A belt comprising:
 a cover layer and opposing continuous tooth section defining an outer surface;
 a cross-linked elastomeric body; and, a tensile reinforcement section disposed between the cover layer and the cross-linked elastomeric body;

wherein the continuous tooth section is comprised of a plurality of tooth structures;

wherein each tooth of the plurality of tooth structures comprises a tooth flank, a land, and an easement area between the tooth flank and the land;

wherein the easement area has a progressively decreasing radial thickness from the tooth flank to the land;

wherein the belt is a spliced belt having a splice positioned in one tooth structure between a pair of corresponding lands; and, wherein the splice comprises a pair of looped cords extending from ends of the tensile reinforcement section, a pair of glad hand connectors disposed between the pair of looped cords, a clamp disposed over the pair and the pair of looped cords on a side of the belt comprising the cover layer, and a bottom clamp disposed on an end of the one tooth, wherein a clamp connector extends through the clamp and between the pair of glad hand connectors, and wherein the clamp connector securely engages the bottom clamp.

2. The belt according to claim 1, wherein the easement area has a low pressure-angle of contact with a sprocket.

3. The belt according to claim 2, wherein the low pressure-angle of contact provides a large shear area.

4. The belt according to claim 1, wherein a deadman is disposed within each loop comprised in the pair of looped cords.

5. The belt according to claim 4, wherein the deadman comprises a kickstand structure.

6. A spliced belt comprising:
   a cover layer and opposing continuous tooth section defining an outer surface, wherein the continuous tooth section is comprised of a plurality of tooth structures, and wherein each tooth of the plurality of tooth structures comprises a tooth flank, and a land;
   a cross-linked elastomeric body; and,
   a tensile reinforcement section disposed between the cover layer and the cross-linked elastomeric body; and,
   a splice positioned in one tooth structure between a pair of corresponding lands;

wherein the splice comprises a pair of looped cords extending from ends of the tensile reinforcement section, a pair of glad hand connectors disposed between the pair of looped cords, a clamp disposed over the pair and the pair of looped cords on a side of the belt comprising the cover layer, and a bottom clamp disposed on an end of the one tooth, wherein a clamp connector extends through the clamp and between the pair of glad hand connectors, and wherein the clamp connector securely engages the bottom clamp.

7. The spliced belt according to claim 6 further comprising an easement area between the tooth flank and the land.

8. The spliced belt according to claim 7, wherein the easement area has a progressively decreasing radial thickness from the tooth flank to the land.

9. The spliced belt according to claim 7, wherein the easement area has a low pressure-angle of contact with a sprocket.

10. The spliced belt according to claim 6, wherein a deadman is disposed within each loop comprised in the pair of looped cords.

11. The spliced belt according to claim 10, wherein the deadman comprises a kickstand structure.

12. A feederhousing comprising a plurality of elastomeric drive belts,
   wherein each belt comprised in the plurality of elastomeric drive belts comprises:
   a cover layer and opposing continuous tooth section defining an outer surface;
   a cross-linked elastomeric body; and,
   a tensile reinforcement section disposed between the cover layer and the cross-linked elastomeric body;

wherein the continuous tooth section is comprised of a plurality of tooth structures;

wherein each tooth of the plurality of tooth structures comprises a tooth flank, a land, and an easement area between the tooth flank and the land;

wherein the easement area has a progressively decreasing radial thickness from the tooth flank to the land; and, wherein the plurality of elastomeric drive belts are spliced belts, wherein each of the spliced belts further comprise a splice positioned in one tooth structure between a pair of corresponding lands; and wherein the splice comprises a pair of looped cords extending from ends of the tensile reinforcement section, a pair of glad hand connectors disposed between the pair of looped cords, a clamp disposed over the pair and the pair of looped cords on a side of the belt comprising the cover layer, and a bottom clamp disposed on an end of the one tooth, wherein a clamp connector extends through the clamp and between the pair of glad hand connectors, and wherein the clamp connector securely engages the bottom clamp.

13. The feederhousing according to claim 12, wherein the easement area has a low pressure-angle of contact with a sprocket.

14. The feederhousing according to claim 12, wherein a deadman is disposed within each loop comprised in the pair of looped cords, and wherein the deadman comprises a kickstand structure.

* * * * *